E. GARDNER.
SPEED BOAT.
APPLICATION FILED DEC. 16, 1920.
1,396,831.
Patented Nov. 15, 1921.
2 SHEETS—SHEET 2.
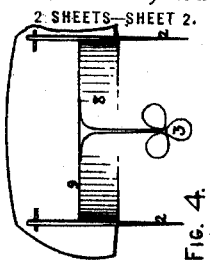
Fig. 4.
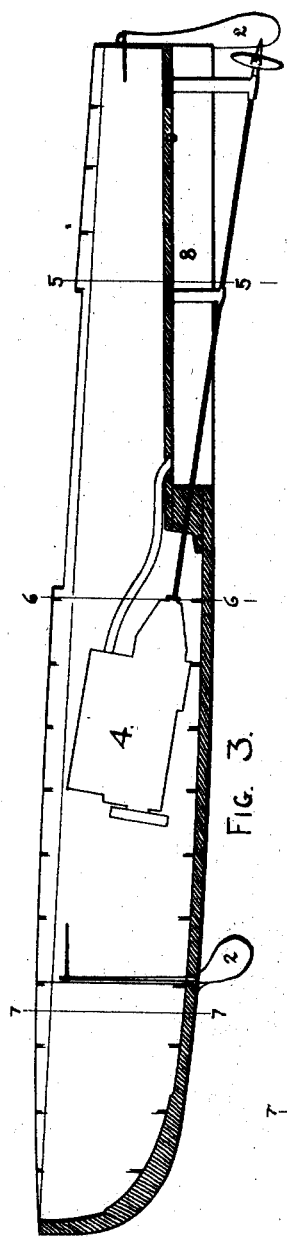
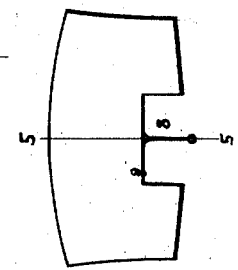
Fig. 5.
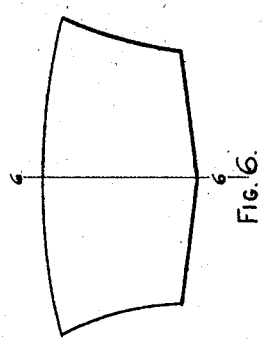
Fig. 6.
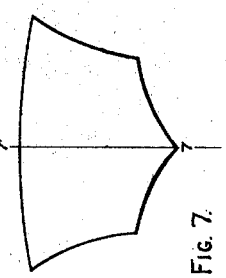
Fig. 7.
INVENTOR.
Elliott Gardner.
BY
ATTORNEYS.

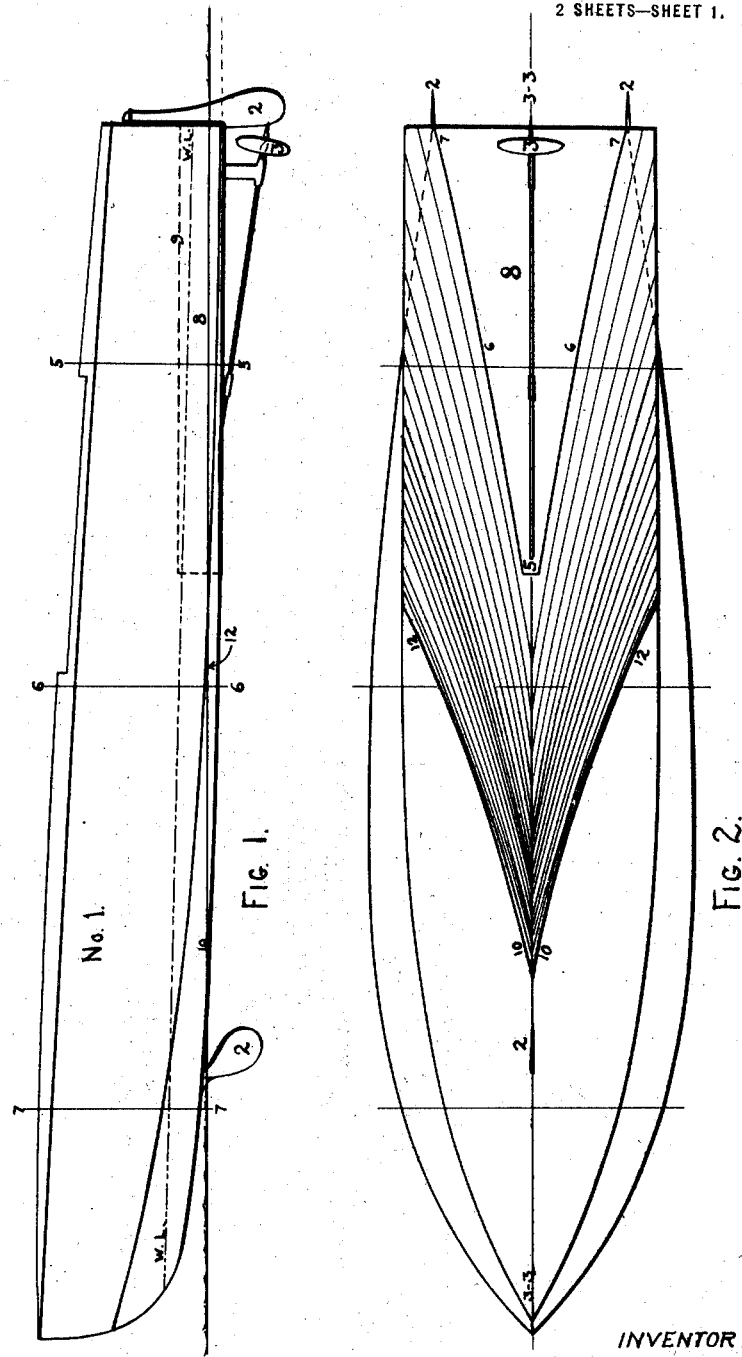

UNITED STATES PATENT OFFICE.

ELLIOTT GARDNER, OF COLONIE, NEW YORK, ASSIGNOR TO ALBANY BOAT CORPORATION, OF WATERVLIET, NEW YORK, A CORPORATION OF NEW YORK.

SPEED-BOAT.

1,396,831.   Specification of Letters Patent.   Patented Nov. 15, 1921.

Application filed December 16, 1920. Serial No. 431,130.

*To all whom it may concern:*

Be it known that I, ELLIOTT GARDNER, a citizen of the United States, residing at Colonie, in the county of Albany and State of New York, have invented new and useful Improvements in Speed-Boats, of which the following is a specification.

Reference may be had to the accompanying drawings, and the reference characters marked thereon, which form a part of this specification. Similar characters refer to similar parts in the several figures therein.

This invention relates to boats of various kinds, but it is more particularly adapted for fast motor boats or speed boats.

The principal object of the invention is to minimize the area of water-contacting surface of the hull of a boat, without substantially reducing the area of the water-contacting planing or lifting surface of the hull at speed.

Other objects will appear in connection with the following description.

In the forward operation at speed of a motor boat of the speed or racing type, the hull tends to rise more or less upon and from the water, due to the lifting or planing action of the bottom surface of the hull which is so shaped as to exert a hull-lifting force when forwardly projected against a body of water; and it is considered desirable in such a type of boat to have the bottom so shaped that as the speed increases, correspondingly greater portions of the hull, measured from the bow aft, are lifted wholly above the surface of the water until at maximum speed the initial planing surface of the bottom, that is the most forward portion of the bottom surface which engages the water, is approximately amidships.

I have found that the most effective, lifting or planing action is at the moment of primary contact of the water with the planing surface of the hull, and that after such primary contact and resultant disturbance of the water, the surfaces extending aft of the initial planing surface of the bottom are of gradually decreasing, lifting or planing value.

The bottom of a boat of this type being made V-shape in cross section, as the bow of the boat rises from the water the initial planing surface or surfaces will extend aft in divergent lines so that the effectiveness of the planing or lifting surfaces of the boat bottom in gradually decreasing aft of the initial planing surfaces also decreases toward the center line of the boat.

I have ascertained that in a modern speed-boat having a V-shaped bottom, little or no planing or lifting effect is obtained from a substantial area of the bottom of the hull of considerable width on opposite sides of the center line of the boat at the stern and gradually diminishing in width forward to a point just aft of the initial planing surface at the center line of the boat.

This area while substantially ineffective as a planing or lifting surface constitutes a substantial area of the wetted surface of the hull, the frictional engagement of which with the water is one of the greatest impediments to high speed.

I have ascertained that by removing to a plane above the wake-water-line, a bottom portion of a boat of this type corresponding in area to the surface which is substantially ineffective for lifting and planing purposes, as I have above explained, I am able to relieve the boat of the retarding effect of substantially the same area of wetted frictional surface with a resultant substantial increase in the speed of the boat.

Figure 1 of the drawings is a view in side elevation of the hull of a speed-boat embodying my invention.

Fig. 2 is a bottom plane view of the same.

Fig. 3 is a central vertical longitudinal section of the same taken on the broken line 3—3 in Fig. 2.

Fig. 4 is a view in elevation of the stern of the boat.

Fig. 5 is a vertical cross section of the same taken on the broken line 5—5 in Fig. 1.

Fig. 6 is a vertical cross section of the same taken on the broken line 6—6 in Fig. 1.

Fig. 7 is a vertical cross section of the same taken on the broken line 7—7 in Fig. 1.

Referring to the drawings wherein the invention is shown in preferred form, 1 is the hull of the boat, the bottom of which is V-shaped in cross section and of increasing width of cross-sectional angle from the bow aft as shown by the several cross sectional views.

The boat may be propelled and steered in any known manner.

I have shown a conventional rudder, 2, which may be operated in any known manner, and a conventional screw, 3, which may be driven by any known form of motor as a gas-engine, 4.

The normal water line of the boat at rest is indicated by the dotted line W. L.—W. L. The line of initial contact of the water with boat at speed is indicated by the aftward divergent lines 10—12.

Along the inner sides of said lines extend the initial planing surfaces of the boat bottom.

I have on Fig. 2 diagrammatically shown by shade lines between the lines 1—2 the relative lifting or planing effectiveness of portions of the boat bottom extending inwardly and aft of the initial planing surfaces, the effectiveness increasing as said lines approach one another and decreasing as the lines diverge from one another.

From this diagrammatic showing it will be seen that the effectiveness of the bottom surface of the hull as a planing or lifting surface more or less gradually diminishes from the initial planing surfaces aft and toward the center line of the boat forming a somewhat V-shaped area shown bounded by the lines, 5, 6 and 7, of substantial width on opposite sides of the center line of the stern of the boat, and gradually diminishing in width to a point just aft of the initial planing surfaces at the center line.

In eliminating this ineffective area, I elevate a portion of the bottom of the boat corresponding with this area to form a space extending to the stern, 8, open to a plane, 9, above the wake-water-line at speed.

By wake-water-line, I mean the line at the level of the water between the side lines of the boat where the water makes final contact with the boat.

A further desirable result obtained by the use of my invention is to lessen the displacement of the boat at the stern so that the boat has its greatest displacement approximately amidships with moderate displacement aft, thereby attaining greater seaworthiness in rough water than has heretofore been practicable in speed boats.

What I claim as new and desire to secure by Letters Patent is:

1. A boat having a hull with aftward divergent, water-engaging, planing, bottom surfaces.

2. A speed-boat having a hull with aftward divergent, water-engaging, planing, bottom surfaces separated by a space extending to the stern and open to a plane above the wake-water-line at speed.

3. A speed-boat having a hull the bottom of which is substantially V-shaped in cross section forward, and amidships, and which has extending from amidships aft divergent, water-engaging, planing surfaces.

4. A speed-boat having a hull the bottom of which is substantially V-shaped in cross section forward and amidships, and which has extending from amidships aft divergent, water-engaging, planing surfaces separated by a space extending to the stern and open to a plane above the wake-water-line at speed.

5. A speed-boat having a hull, the bottom of which is substantially V-shaped in cross section with the cross sectional angle gradually increasing from forward toward amidships whereat the bottom has a transversely continuous, water-engaging, planing, surface, said bottom having water-engaging, planing surfaces extending divergently aft from said transversely continuous, planing surface.

6. A speed-boat having a hull the bottom of which is substantially V-shaped in cross section with the cross-sectional angle gradually increasing from forward toward amidships, whereat the bottom has a transversely continuous, water-engaging, planing surface, said bottom having water-engaging, planing surfaces extending divergently aft from said transversely continuous, planing surface, and separated by a space extending to the stern and open to a plane above the wake-water-line at speed.

In testimony whereof, I have hereunto set my hand this 9th day of December, 1920.

ELLIOTT GARDNER.